United States Patent [19]

Pommier

[11] 4,271,891
[45] Jun. 9, 1981

[54] RADIAL CARCASS TIRE EMPLOYING CARCASS EXPANSION LIMITING BLOCK

[75] Inventor: Jean Pommier, Clermont-Ferrand, France

[73] Assignee: Compagnie Generale des Etablissements Michelin, Clermont-Ferrand, France

[21] Appl. No.: 117,036

[22] Filed: Jan. 30, 1980

Related U.S. Application Data

[63] Continuation-in-part of Ser. No. 19,130, Mar. 9, 1979, abandoned.

[30] Foreign Application Priority Data

Mar. 10, 1978 [FR] France ............................ 78 07384

[51] Int. Cl.³ .......................... B60C 9/08; B60C 9/20
[52] U.S. Cl. ........................ 152/352 R; 152/354 R; 152/359; 152/361 FP; 152/361 DM
[58] Field of Search ............ 152/352 R, 352 A, 353 R, 152/354 R, 361 R, 361 FP, 361 DM, 359

[56] References Cited

U.S. PATENT DOCUMENTS

| | | | |
|---|---|---|---|
| 2,884,040 | 4/1959 | Boussu et al. | 152/356 R |
| 3,018,814 | 1/1962 | Saint-Paul | 152/361 FP |
| 3,233,649 | 2/1966 | Jolivet et al. | 152/361 R |
| 3,515,197 | 6/1970 | Boileau | 152/361 FP |
| 3,754,588 | 8/1973 | Rach et al. | 152/361 FP |
| 4,016,916 | 4/1977 | Ravagnani | 152/361 R |
| 4,092,196 | 5/1978 | Miller et al. | 152/361 R |

FOREIGN PATENT DOCUMENTS

| | | | |
|---|---|---|---|
| 1135604 | 5/1957 | France | 152/361 |
| 1142709 | 9/1957 | France | 152/361 |
| 1214031 | 4/1960 | France | 152/361 |
| 1377323 | 9/1964 | France | 152/361 |
| 808824 | 2/1959 | United Kingdom | 152/361 |

Primary Examiner—John T. Goolkasian
Assistant Examiner—Lois E. Boland
Attorney, Agent, or Firm—Brumbaugh, Graves, Donohue & Raymond

[57] ABSTRACT

A radial carcass tire with a tread reinforcement is improved due to the fact that between the radial carcass reinforcement and the tread reinforcement there is arranged a limiting block composed of two superimposed crossed plies whose wires or cables form opposite angles with the longitudinal direction, each of which is other than zero and less than the smallest angle used in the tread reinforcement.

13 Claims, 3 Drawing Figures

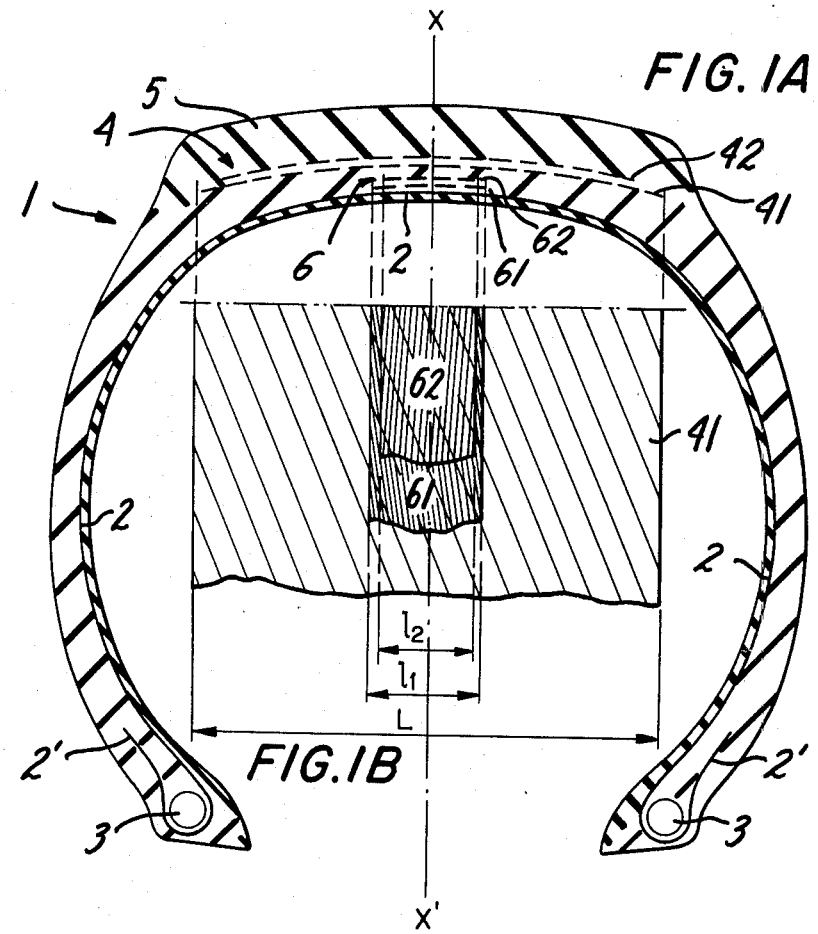
FIG. 1A
FIG. 1B
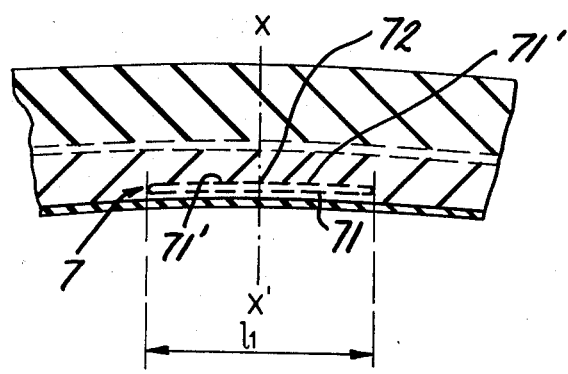
FIG. 2

RADIAL CARCASS TIRE EMPLOYING CARCASS EXPANSION LIMITING BLOCK

This application is a continuation-in-part application of U.S. application Ser. No. 19,130, filed Mar. 9, 1979, now abandoned.

The present invention relates to improvements in tires having a radial carcass reinforcement anchored on both sides to at least one bead ring and having a thread reinforcement formed of at least two superimposed plies of wires or cables which are parallel in each ply and crossed from one ply to the other, the wires or cables of each ply forming an acute angle with the longitudinal direction of the tire, this tread reinforcement being parallel to the radial carcass reinforcement at least along an equatorial zone (that is to say a zone centered on the equator).

It is known that a radial carcass reinforcement anchored to bead rings and mounted on a rim assumes, under the effect of the inflation pressure and in the absence of load and any other reinforcement, an equilibrium meridian profile which is termed the natural profile. This equilibrium profile is characterized by the fact that it has a distance from the seats of the beads on the rim as well as a curvature in the equatorial zone which are maximum compared to those which would be present in the case of a bead-to-bead reinforcement of the same length formed of oblique plies crossed symmetrically with respect to the longitudinal direction of the tire.

When a tread reinforcement is superimposed on a radial carcass reinforcement, the tread reinforcement is elongated under the thrust of the underlying radial carcass reinforcement and tends to assume a smaller meridian curvature than the radial carcass reinforcement in the zone of equatorial superposition.

It is known that the effect of this difference in curvature is harmful for the life of the tire. The edges of the tread reinforcement are spaced radially from the radial carcass reinforcement and subjected to deformations of excessive amplitude upon travel. A length less than that corresponding to the natural equatorial diameter of the radial carcass reinforcement has thus been adopted for the tread reinforcement. Under the effect of the inflation pressure, the radial carcass reinforcement subjects the tread reinforcement to a tensile stress, particularly in the region of equatorial superposition. This stress is harmful to the life of the tread upon travel.

The object of the present invention is to eliminate the above-described harmful reactions of the radial carcass reinforcement on the tread reinforcement. Due to the invention this reinforcement, contrary to the functions fulfilled by its homologue known as crown reinforcement in ordinary radial tires, is intended exclusively for the reinforcement and stabilization of the tread.

Accordingly, the tire in accordance with the invention, of the type described above, is characterized by the fact that between the tread reinforcement and the radial carcass reinforcement in the equatorial zone of the tire there is arranged a limiting block formed of two superimposed plies of wires or cables.
of a width less than the width of the tread reinforcement,
which plies are crossed with respect to the longitudinal direction of the tire,
each form with said longitudinal direction angles which in absolute value are both other than zero and less than the smallest angle of the plies of the tread reinforcement with the longitudinal direction, and preferably less than one-half of said angle,
the reinforcement wires or cables of the two plies of the limiting block being of low extensibility.

Metal cables formed of steel wires of high cable lay are preferably used, this lay being between 12 and 20 times the apparent diameter of the cable, and the relative elongation $\Delta l/l$ of the cable being less than 0.2% under a load equal to 10% of the rupture load of the cable. In the case of the use of noncabled wires, preferably of steel, these wires have a relative elongation less than 0.2% under a load equal to 10% of the rupture load of the wire.

The two plies in accordance with the invention form a limiting block which limits the natural expansion of the subjacent radial carcass reinforcement under the effect of the inflation pressure. Therefore, this limiting block has an inner diameter, taking into account the diameters of the reinforcement elements and the thicknesses of the layers of rubber used, which is at most equal to the natural outer diameter of the radial carcass reinforcement when the tire is mounted on a rim, inflated and without any other reinforcement. By circumscribing the radial carcass reinforcement, this limiting block absorbs, instead of the block formed by the customary crown plies, the expansion stresses which come from the radial carcass reinforcement.

In order to screen off as well as possible the transmission of tensions coming from the pressure of the radial carcass reinforcement and taking into account the fact that no ply reinforcement element, even of steel or of glass fibers, is inextensible in actual practice, the invention contemplates arranging the reinforcement elements of the plies of the limiting block at an angle other than zero with respect to the longitudinal direction. The crossed plies have in fact a tendency to decrease the meridian curvature of the limiting block under the effect of an internal pressure.

Cooperating with the crossing of the plies of the limiting block, the obliqueness of the plies of the limiting block makes it possible to control, and if necessary adapt, the meridian curvature of the limiting block. This meridian curvature decreases or increases with the angle formed by the two plies.

In order to preserve the properties of the tread reinforcement, it is important that the width of the limiting block be between 100% and 60% of the width of the equatorial zone along which the tread reinforcement is parallel to the radial carcass reinforcement. The limiting block preferably covers an equatorial zone of a width of between 5% and 80% of the maximum axial width of the tire and more particularly between 12% and 20% for a ratio H/B close to 1, between 24% and 40% for a ratio H/B close to 0.75, and between 45% and 80% for a ratio H/B close to 0.3, H being the radial height of the tire on its rim and B being the maximum axial width of the tire, these dimensions being measured in accordance with the customary standards.

Preferably, one of the plies of the limiting block is narrower than the other ply. The difference in width is, however, at most equal to 10% of the width of the widest ply. This avoids placing large amounts of rubber on both sides of the edges of the limiting block between the tread reinforcement and the radial carcass reinforcement.

It is also of interest to form the limiting block in accordance with the invention by means of a ply whose edges are folded in such a manner as to meet each other, or from a ply which is folded on itself.

The tension T per unit of width measured in the axial direction exerted on a ply by the radial carcass reinforcement can be evaluated in first approximation by means of the formula $T = p \cdot R/2 \cos^2 \alpha$. In this formula, p is the inflation pressure of the tire, R is the radius of the ply with respect to the axis of rotation of the tire, and $\alpha$ is the angle of the cables of the ply with the longitudinal direction. This formula indicates why the invention contemplates use in the limiting block of angles $\alpha$ less, preferably, than one-half of the smallest angle used in the tread reinforcement. Thus, the tension T of a ply of the limiting block is always less than the tension of the ply having the smallest angle in the tread reinforcement. The elongation of the limiting block under the effect of the tension coming from the radial carcass reinforcement is thus less. This avoids transmitting this tension to the tread reinforcement.

French Pat. No. 1,142,704, which corresponds to U.S. Pat. No. 2,884,040, describes a tire with a radial carcass reinforcement with a triangulated system of crown plies, a single oblique ply which is narrower than the crown plies being arranged below the radial carcass reinforcement or between the radial carcass reinforcement and the crown plies. This single ply has the purpose of avoiding ruptures of the bridges of rubber between the cables of the radial carcass reinforcement when the tire moves over protruding obstacles. This isolated ply elongates and transmits the tension to the plies located above it.

French Pat. No. 1,214,031, describes a tire, the load-carrying capacity of which is increased by including an equatorial cylindrical portion in the ordinary tread. This cylindrical portion comprises, in addition to an ordinary reinforcement, at least one ply of longitudinal cables which has the width of the cylindrical portion.

French Pat. No. 1,377,323 describes a tire whose crown reinforcement has a longitudinal discontinuity. A ply of oblique cables width is limited to that of the zone involved in the discontinuity is arranged radially inward of the crown reinforcement in order to bridge over the discontinuity.

One embodiment of the invention is described below with reference to the drawing, in which:

FIG. 1A shows a tire provided with a limiting block composed of two plies, seen in radial section, alongside of which in FIG. 1B is a plan view of the plies of wires or cables, essential for an understanding of the invention, and FIG. 2 is a view in radial section on a larger scale through a limiting block composed of a single folded ply.

The tire 1 shown in FIG. 1A comprises a radial carcass reinforcement 2 whose ends 2' are each turned up around a bead ring 3. A tread reinforcement 4, which is arranged directly below the tread 5, is formed of two crossed plies 41, 42 which are oblique with respect to the longitudinal direction X—X'. Between the radial carcass reinforcement 2 and the tread reinforcement 4 there is arranged a limiting block 6 of width $l_1$ less than the width L of the tread reinforcement 4. This limiting block 6 is formed of two plies 61, 62 of widths $l_1$ and $l_2$. The width $l_2$ of the radially outer ply 62 is less than the width $l_1$ of the ply 61. The limiting block 6 is parallel to the radial carcass reinforcement 2. The same is true of the tread reinforcement 4, at least in the zone surrounding the limiting block 6.

As can be seen from the plan view (FIG. 1B) shown alongside the radial section (FIG. 1A), the angles of the plies 61, 62 of the limiting block 6 are all smaller than the angle of the ply 41 of the tread reinforcement 4. The cables of the plies 61, 62 are of steel of low extensibility since their cable lay is greater than 15 times their apparent diameter.

The tire shown only in part in FIG. 2 differs from that of FIG. 1A by the fact that its limiting block 7 is formed of a ply 71 whose two edges have been folded radially outward to form two flaps 71' whose total length is equal to that of the unfolded portion 71 so that these flaps 71' meet; in this example, the line along which they meet coincides with the trace X—X' of the median plane of the tire and is indicated by the reference number 72.

Although in the foregoing and in the claims which follow reference is made to the smallest angle used for the plies of the tread reinforcement with respect to the longitudinal direction, the invention applies just as well in the event that the plies in question form equal angles (in absolute value) with said direction, so that the angles which the wires or cables of the limiting block form with the longitudinal direction must be smaller than the angle (and no longer the smallest angle) of the plies of the tread reinforcement.

It is also useful to employ a limiting block 6 consisting of two crossed plies 61, 62, the wires or cables of which make different angles $\alpha$ in absolute value while remaining of opposite sign. The advantage of such asymmetrical arrangement is to correct, if necessary, lateral (axial) non-uniformity thrusts induced by the tread reinforcement 4, or to prevent, especially in cases where a relatively wide limiting block 6 is used, the generation of such nonuniformity thrusts by the limiting block 6 itself. These thrusts may disturb the vehicle behavior and cause uneven wear of the tread 5.

In fact, a limiting block 6 formed by two symmetrically disposed plies 61, 62 (e.g., at angles $+\alpha$ and $-\alpha$) basically generate such harmful thrusts, because the two plies 61, 62 are not located at the same distance from the axis of rotation of the tire 1. Consequently, a limiting block 6 which does not generate lateral thrusts has its wires or cables disposed at asymmetrical angles $\alpha$. By preference, the limiting block-ply 61, the wires or cables of which are oriented at the greater angle $\alpha$ should be disposed radially inside the other ply 62. A satisfactory angular arrangement is thus 8° for the radially inner ply 61 and 3° for the radially outer ply 62.

What is claimed is:

1. A tire with a radial carcass reinforcement anchored on both sides to at least one bead ring and with a tread reinforcement which is arranged directly below the tread and which is parallel to the radial carcass reinforcement at least along an equatorial zone and which is a block formed of at least two superimposed plies of wires or cables parallel in each ply and crossed from one ply to the other forming acute angles with the longitudinal direction of the tire, characterized by the fact that between the tread reinforcement and the radial carcass reinforcement in the equatorial zone of the tire there is arranged a limiting block formed of two superimposed plies of wires or cables of low extensibility which are parallel to each other in each ply and crossed from one ply to the other forming with the longitudinal direction angles of opposite sign, each being both other than zero and less in absolute value than the smallest angle used in the tread reinforcement, the width of the limiting block being less than the width of the tread reinforcement, and further characterized by the fact that the width of the limiting block is between 100% and 60% of the width of the equatorial zone along which the tread reinforcement is parallel to the radial carcass reinforcement and wherein the wires or cables of low extensibility of the limiting block have a relative elongation less than 0.2% under a load equal to 10% of their rupture load.

2. The tire according to claim 1, characterized by the fact that the opposite angles formed by the wires or cables of the two plies of the limiting block are asymmetrical with the longitudinal direction of the tire.

3. The tire according to claim 2, characterized by the fact that the wires or cables of the radially inner ply of the limiting block form a greater angle than that of the wires or cables of the radially outer ply of the limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of the limiting block are symmetrical with the longitudinal direction of the tire.

6. The tire according to claim 2 or claim 5, characterized by the fact that each of the angles of the plies of the limiting block is less than one-half of the smallest angle of the plies of the tread reinforcement.

7. The tire according to claim 2 or claim 5, characterized by the fact that the limiting block has an inner diameter which is at most equal to the natural outer diameter of the radial carcass reinforcement when the tire is mounted on a rim, inflated and without any other reinforcement.

8. The tire according to claim 2 or claim 5, characterized by the fact that the limiting block covers an equatorial zone of a width of between 5% and 80% of the maximum axial width of the tire and more particularly between 12% and 20% for a ratio H/B close to 1, between 24% and 40% for a ratio H/B close to 0.75, and between 45% and 80% for a ratio H/B close to 0.3, H being the radial height of the tire on its rim and B being the maximum axial width of the tire.

9. The tire according to claim 2 or claim 5, characterized by the fact that the limiting block is arranged parallel to the radial carcass reinforcement.

10. The tire according to claim 2 or claim 5, characterized by the fact that one of the plies of the limiting block is narrower than the outer ply, the difference in width being at most equal to 10% of the widest ply.

11. The tire according to claim 5, characterized by the fact that the limiting block is formed of a folded ply.

12. The tire according to claim 2 or claim 5, characterized by the fact that the cables of the limiting block are formed of steel wires and have a cable lay of between 12 and 20 times the apparent diameter of the cable.

13. The tire according to claim 2 or claim 5, characterized by the fact that the limiting block is formed of noncabled wires which are metallic and preferably of steel.

* * * * *